United States Patent [19]
Chatterjee et al.

[11] Patent Number: 6,127,436
[45] Date of Patent: Oct. 3, 2000

[54] RECLAIMED POLY (ETHYLENE TEREPHTHALATE) COATING

[75] Inventors: Subhankar Chatterjee, Hampton; Albert A. Kveglis, Pine Brook; Neil Young, Oakland; Robert Kern, Carlstadt; Thomas F. O'Malley, Westfield; Bhalendra J. Patel, Kendall Park, all of N.J.

[73] Assignee: Sun Chemical Corporation, Fort Lee, N.J.

[21] Appl. No.: 09/178,826

[22] Filed: Oct. 26, 1998

[51] Int. Cl.$^7$ ....................................... C08J 11/04
[52] U.S. Cl. .................. 521/48.5; 528/275; 528/279; 528/285; 525/437; 525/444; 524/783; 524/791
[58] Field of Search ..................... 528/275, 279, 528/285; 525/437, 444; 524/783, 791; 521/48.5

[56] References Cited

U.S. PATENT DOCUMENTS

| | | | |
|---|---|---|---|
| 3,427,267 | 2/1969 | Stieger, et al. | 260/22 |
| 5,252,615 | 10/1993 | Rao et al. | 521/48.5 |
| 5,371,112 | 12/1994 | Saye et al. | 521/48 |
| 5,552,478 | 9/1996 | Fisher | 525/41 |
| 5,668,186 | 9/1997 | Brunelle et al. | 521/48 |

FOREIGN PATENT DOCUMENTS 1146641  6/1966  United Kingdom .

OTHER PUBLICATIONS

Smoluck George R., Modern Plastics, "PET reclaim business picks up new momentum", Feb. 1988, pp. 87–91.

Vaidya U.R., Nadkarni, V.M., Journal of Applied Polymer Sciences, "Unsaturated Polyesters from PET waste: Kinetics of Polycondensation", vol. 34, 1987, pp. 235–245.

Journal of Applied Science, "Polyurethanes Synthesized from Polyester Polyols Derived from PET Waste", vol. 55, 1995, pp. 1271–1273.

Journal of Applied Science, "Polyester Polyols from Glycolzed PET Waste: Effect of Glycol Type on Kinetics of Polyesterification", vol. 38, 1989, pp. 1179–1190.

*Primary Examiner*—Samuel A. Acquah
*Attorney, Agent, or Firm*—Sidney Persley

[57] ABSTRACT

An organic oligomer binder produced by depolymerizing virgin, scrap, recycled or reclaimed polyethylene terephthalate via an alcoholysis reaction with branched glycols and esterifiing the resulting polyol oligomer with polybasic carboxylic acids and/or anhydrides.

22 Claims, No Drawings

RECLAIMED POLY (ETHYLENE TEREPHTHALATE) COATING

BACKGROUND OF THE INVENTION

1. Field of the Invention

The invention relates to energy curable coating resins made of poly(ethylene)terephthalate resin useful as binder materials in coating compositions and to a process for producing these compositions.

2. Background of the Invention

Material recycling and resource recovery are common practices in all but a few industries. Responding with passion and prudence to the new awareness of the fragility of our ecosystem, society has set about the rectification of past material excesses by falling upon the more ubiquitous materials used in modern civilization for corrective recovery. There is none more ubiquitous than plastics and no more ubiquitous plastics than polyolefins and polyesters such as polyethylene terephthalate (PET).

PET is a high molecular weight linear polymer known in the fiber, film and plastic industries for more than forty years. The polymer is prepared from dimethyl terephthalate and ethylene glycol via a transesterification reaction, which is typically carried out with a basic catalyst such as antimony trioxide. The resulting material is a high melting solid exhibiting superior clarity, excellent mechanical properties, good thermal stability and resistance to common solvents. It can be readily melt spun to fiber, cast as film, extruded, blow or injection molded into a wide variety of high value articles. Compared to polyolefins, PET is a relatively expensive resin as the monomers are derived from para xylene and ethylene. Nonetheless, the properties of PET are so superior that the resin successfully challenges polyolefins as the material of choice for the manufacture of clothing, carpeting, industrial products, soft drink bottles, cast and injection molded articles.

PET's utility and success places discarded PET materials high on the list of those discarded plastics and fibers that must be collected and recycled. But it is rare that reclaimed or recycled PET is used to replace virgin resin in processing plastic materials. This is because the process seldom can be carried out without some degree of degradation of the reclaimed polymer. This limits the amount of reclaimed PET that can be used to mold resins or film and all but eliminates the use of reclaimed PET in fibers. Consequently, the plastic industry has been hard at work to find better ways to employ reclaimed PET to take advantage of its superior mechanical and chemical properties.

Of course, resins of many varieties such as solvent-borne, ultra-violet (UV) and electron beam (EB) energy curable resins, are used in enormous quantities for a multitude of applications in the organic coatings industries, i.e. as protective, barrier and insulating coatings, adhesives, sealants, dye and ink coatings, etc. However, virgin PET has garnered little of the coating market for resins because of its cost. The resins commonly used are vinyl polymers, particularly acrylates, polyvinyl chloride and polyvinyl acetate, epoxies, polyolefins, polyurethanes, aliphatic polyesters, phenolics, and the like. They are used in coating formulations as pre-formed high molecular weight polymers such as acrylate latex or, more typically, as low molecular weight oligomers which are crosslinked to form a matrix subsequent to being applied on a substrate. Despite its otherwise superior mechanical and chemical properties, virgin PET cannot compete with the foregoing resins of choice in price or availability. In the organic coatings industry it is desirable to have readily available UV/EB crosslinkable PET oligomers.

At least with respect to price, reclaimed PET can compete with some of the more commonly used resins in coatings. For instance, the current price of reclaimed PET is far below the price of acrylates, particularly polymethylmethacrylate, which are commonly incorporated as the resin of choice for UV/EB curable coatings where high performance dictates the choice of resin. But for the absence of a readily UV/EB crosslinkable reclaimed PET oligomer, organic coatings would appear to be a viable market use for reclaimed or recycled PET.

S. Lee et al., *Polyurethanes Synthesized from Polyester Polyols Derived from PET Waste*, Journal of Applied Polymer Science, Vol. 55, pgs. 1271–73 (1995), teaches the depolymerization of PET waste by glycolysis to obtain oligomeric diols.

U. R. Vaidya et al., *Unsaturated Polyesters from PET Waste*, Journal of Applied Polymer Science, Vol. 34, pgs 235–46 (1987), teaches the glycolysis of PET waste with propylene glycol at different weight ratios.

U.S. Pat. No. 5,552,478 teaches preparing oligomeric glycols from recycled PET by digesting a recyled PET feedstock with asymmetrical glycols then reacting the resulting mixture with acids having fewer than 12 carbon atoms.

It is an object of the present invention to provide a low cost PET oligomer for use in coating formulations and as a binder in UV and EB curable coatings.

Another objective of the invention is to produce the resin primarily from recycled or reclaimed PET.

Other objects and advantages of the invention will become apparent from the following description of embodiments.

SUMMARY OF THE INVENTION

In one aspect the invention is a PET oligomer, having a number average molecular weight of about 850 to 5,000, a weight average molecular weight of about 4,000 to 25,000 and an acid value of about 5 to 50 mg KOH per gram comprised of about 40 to 70 weight percent recurring ethylene terephthalate units, recurring units of $C_3$+ alpha alkylene terephthalate and hydroxy alkylene terephthalate, and pendant units of polybasic aliphatic alicyclic or aromatic polycarboxylate.

In another aspect the invention is oligomeric PET polyol comprised of about 40 to 70 weight percent recurring ethylene terephthalate units having the structure:

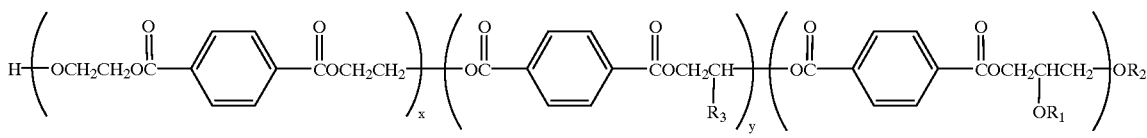

wherein $R_3$ is alkyl; $R_1$ and $R_2$, alike or different, are hydrogen, aliphatic, alicyclic or aromatic carbonyl or carboxy carbonyl; x is an integer of 1 to 20, and y and z are integers of 1–10.

In yet another aspect, the invention is a process for converting PET polymer into an organic binder oligomer having an acid value between 5 and 50 mg KOH per gram comprising:

a) contacting PET polymer particles with between 3 and 25 weight percent mixture of $C_3$+ 1,2-alkylene glycol and polyhydric aliphatic alcohol in a 1:2 to 1:5 weight ratio, respectively, under alcoholysis conditions and in the presence of an alcoholysis catalyst for a time sufficient to convert said polymer to a oligomeric PET polyol b) contacting said polyol oligomer with between 5 and 40 weight percent of a polybasic aliphatic, alicyclic or aromatic organic acid or acid anhydride, under esterification conditions.

DETAILED DESCRIPTION OF THE INVENTION

The invention concerns a method of depolymerizing high molecular weight reclaimed, recycled or virgin PET into low molecular weight oligomers. The depolymerization is carried out by alcoholysis with certain glycols and polyhydric alcohols producing an oligomer having residual, derivatizable hydroxy functionality. This hydroxy functional oligomeric PET polyol is then esterified with polybasic carboxylic acids, anhydrides or acyl halides to produce a unique composition of a curable binder oligomer. The resin is deemed to be compatible with various coating formulations as a replacement for more expensive acrylate binders and other resinous materials in organic coatings.

The derivatized PET compositions of the present invention achieve their unique compatibility with organic coating formulations by depolymerizing the reclaimed, recycled or virgin PET via an alcoholysis reaction using glycols and polyhydric alcohols that incorporate alkyl branching in the backbone of the oligomer. While not wishing to be bound by theory, it is believed that the branching disturbs the degree of crystalinity in the backbone and converts the oligomer to one that is more amenable to solvolysis by conventional components of organic coating systems. Preferably, the alcoholysis is carried out using a mixture of propylene glycol and glycerol.

The degree of depolymerization of the reclaimed or virgin PET, which is a measure of the molecular weight of the resultant oligomer, can be controlled by a variety of process means or by adding depolymerization control agents. Also, the mole ratio of glycol used in depolymerization can serve as a means of securing the preferred range of molecular weights for the oligomer.

The oligomer's hydroxyls (polyol) units are reacted with any appropriate reagent having a functionality greater than 1 and capable of converting the oligomer to one capable of forming an organic coating matrix by curing and crosslinking. This may be conveniently realized with agents such as polycarboxylic acids, esters, anhydrides or acyl halides to form a binder resin. The residual acid functionality can be used for subsequent reactions for example forming an $Al^{++}$ salt by employing aluminum chelating agents. Of course, other agents may be used, including polyisocyanates.

An important consideration in the preparation of the derivatized oligomer of the present invention is the requirement that the oligomeric polyol be derivatized in such a manner as to provide a sufficient, but not excessive, amount of branching. Insufficient or excessive branching negatively affects the utility of the any matrix formed. Carboxylic acids can be used to render the acid value of the oligomer between 5 and 50 mg KOH per gram and produce an oligomeric binder that is compatible with organic coating formulations.

The PET oligomer of the present invention is useful for preparing oligomeric binder for organic coatings. The oligomer comprises between 40 and 70 weight percent of ethylene terephthalate and includes recurring units of $C_3$+ alpha alkylene terephthalate, hydroxy alkylene terephthalate and polybasic aliphatic, alicyclic or aromatic carboxylate moieties. The oligomer has a number average molecular weight between 850 and 5000, a weight average molecular weight between 4,000 and 25,000 and an acid value between 5 and 50 mg KOH per gram.

The oligomer may contain up to 20 weight percent of aliphatic or aromatic monocarboxylate moieties, such as benzoic acid. The oligomer may also contain between 4 and 8 weight percent of $C_3^+$ alpha alkylene terephthalate, between 7 and 11 weight percent of hydroxy alkylene terephthalate, and between 23 and 28 weight percent of polybasic aliphatic, alicyclic or aromatic carboxylate.

The PET oligomer preferably has a number average molecular weight between 1000 and 2000, a weight average molecular weight between 6,000 and 12,000 and an acid value between 27 and 30 mg KOH per gram.

PET polymer suitable for use in the process of this invention is preferably gathered from scrap, recycled or reclaimed PET sources. These sources provide PET at a cost sufficiently low to compete with ordinary coating resin sources. However, other than cost, there is nothing intrinsically limiting the process of the present invention to scrap, recycled or reclaimed PET and competitively priced virgin PET could also be used as feedstock in the process. Reclaimed or recycled PET is available in abundance from waste film, fiber, injection molded and blow molded articles and may be used in the process in the form of chips, flake or powder. The process readily converts virgin, scrap, recycled or reclaimed PET into value added energy curable organic coating resins. Due to the excellent film properties obtained from using PET, e.g. higher degree of strength, stiffness, toughness and gloss, the resin offers an economic and performance alternative to multi-functional acrylated oligomers used in energy curable organic coating formulations.

The process of the present invention may be carried out batch or continuous mode wherein solid, reclaimed, high molecular weight PET particles, preferably in the form of chips or flake, are mixed with at least one branched $C_3$+ glycol, preferably propylene glycol, and optionally, at least one polyhydric alcohol containing at least one secondary hydroxyl group and two primary hydroxyl groups. Glycerol is the preferred polyhydric alcohol. The mixture is then placed in contact with a transesterification or alcoholysis catalyst to produce a reclaimed oligomeric polyol PET having branching secondary hydroxyl groups.

The oligomerization reaction is carried out at a temperature between 150 and 250° C., preferably between 190 and 225° C. and most preferably between 215 and 220° C. for about 2 to 12 hours, preferably 3 hours, or even more preferably until the solid PET, glycol, glycerol mixture converts to a clear or homogeneous mixture or melt-solution that contains no visible PET particles. The resulting oligomeric PET polyol should have a hydroxyl number between 48 and 412. The depolymerization reaction can be carried out at atmospheric, subatmospheric or supra-atmospheric pressures, but preferably is carried out at atmospheric pressure. The alcoholysis step is preferably carried out without removing the ethylene glycol or branched glycol from the reaction mixture in an effort to promote depolymerization of PET to an oligomer.

The second step of the process involves converting, via an esterification reaction, the oligomer PET polyol produced by depolymerization. The oligomeric PET polyol's secondary hydroxyl groups are reacted with a di- or polybasic aliphatic, alicyclic or aromatic carboxylic acid or derivative thereof. The esterification reaction may be carried out under conventional esterification methods and conditions. A preferred acid derivative is a di-carboxy aromatic carboxylic acid anhydride, while more preferred is phthalic acid anhydride (PAA). Methylhexahydrophthalic acid anhydride (MHHPA) may also be used as a preferred acid derivative. The esterification reaction produces a predominantly linear saturated polyester oligomer having an acid value between 5 and 50 mg KOH per gram and more preferably between 20 and 30 mg KOH per gram.

Catalysts which are useful in the depolymerization reaction include any catalysts employed in the conventional synthesis of PET and includes, for example, antimony trioxide, tetraalkyl titanates, alkyl metal hydroxides and methoxides and alkaline earth metal oxide and hydroxides.

An important consideration in the process of the present invention is the selection of glycol employed in the depolymerization. It has been suprisingly discovered that depolymerized PET is most compatible with known organic coating formulations when the PET is depolymerized using alkyl branched or substituted 1,2-glycols. As previously mentioned, it is believed that branched glycols, when incorporated into the PET polymer backbone, disturb the crystalinity of the resulting polyol oligomer and enhance solubility. While propylene glycol, for example 1,2-dihydroxy propane, is preferred, other alkyl and aromatic branched compounds can be used such as alicyclic or aromatic compounds bearing a substituent 1,2-glycol group such as styrene glycol.

The branched glycol, when used as the sole depolymerizing agent, is employed in a weight ratio of 3:25 glycol to PET, but preferably between 4:8. When a polyhydric alcohol is included, the weight ratio of glycol to polyhydric alcohol is between 1:2 to 1:5.

The binder resin of the invention is a PET oligomer comprising between 40 and 70 weight percent recurring ethylene terephthalate units and that in turn have recurring units of $C_3+$ alpha alkylene terephthalate, hydroxy alkylene terephthalate and polybasic aliphatic, alicyclic or aromatic carboxylate. The resin has a number average molecular weight between 850 and 5000, a weight average molecular weight between 4,000 and 25,000 and an acid value between 5 and 50 mg KOH per gram. Optionally, the resin may contain up to 20 weight percent of monocarboxylate, and preferably between 3 and 10 weight percent benzoate.

Preferably, the $C_3^+$ alpha alkylene terephthalate selected is propylene terephtate and the hydroxy alkylene terephthalate selected is 2-hydroxypropylene terephthalate.

The polybasic aliphatic, alicyclic or aromatic carboxylate contained in the binder resin is preferably a dicarboxylic acid carboxylate which may be contained as a dicarboxylate in the oligomer backbone, as a pendant group, or as an end carboxy carboxylate group wherein a single carboxy group is esterified with residual hydroxy group to form a moiety having an ester link to the oligomer and a free carboxylic acid group. Preferably, the polybasic alicyclic carboxylate is selected from methylcyclohexane-1-carboxy-2-carboxylate or methylcyclohexane-1,2-dicarboxylate. The most preferred carboxylate is that derived by reaction of residual hydroxyl groups in the oligomer with phthalic anhydride to produce benzene 1-carboxy-2-carboxylate.

The preferred oligomeric binder contains between 4 and 8 weight percent of $C_3+$ alpha alkylene terephthalate, between 7 and 11 weight percent of hydroxy alkylene terephthalate, between 23 and 28 weight percent of polybasic aliphatic, alicyclic or aromatic carboxylate moieties. The resin has a preferred number average molecular weight between 1000 and 2000, a weight average molecular weight between 6,000 and 12,000 and an acid value between 27 and 30 mg KOH per gram.

The PET oligomer of the invention has between 40 and 70 weight percent recurring ethylene terephthalate units and depicted structurally as follows:

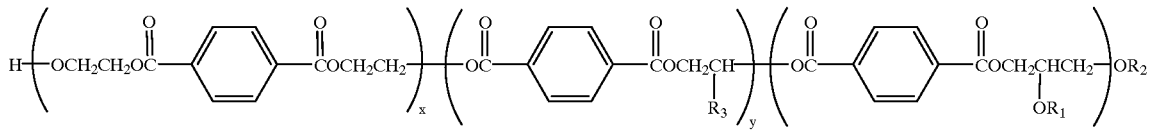

wherein $R_3$ is alkyl; $R_1$ and $R_2$, alike or different, are hydrogen, aliphatic, alicyclic or aromatic carbonyl or carboxy carbonyl; x is an integer of 1 to 20, and y and z are integers of 1–10.

The following examples illustrate specific aspects of the present invention and are not intended to limit the scoipe thereof in any respect and should not be so construed. All parts are in units of parts per 100 parts of product.

EXAMPLE 1

Preparation of a Oligomeric Binder

Scrap PET (35.9 parts, available from Tennessee Eastman Corporation), 1,2-propanediol (4.0 parts, available from Ashland Corporation), glycerol (6.6 parts, available from Ashland Corporation) and Tyzor TBT catalyst (0.3 parts, available from DuPont Company, Tyzor® TBT is a trademark of DuPont Company) were charged to a dry reactor. The mixture was agitated and heated to between 215 and 220° C. under nitrogen and held at this temperature for about 6 hours wherein the PET dissolved. Methyl hexahydrophthalic anhydride (17.7 parts, available from Lonza, Incorporated) was added to the mixture over a 1 hour period while the temperature was increased to 230° C. and water was removed. Benzoic acid (6.0 parts) was added and the temperature was again raised and maintained at 240° C. until the acid number of the binder resin was no longer decreasing linearly with time.

EXAMPLE 2

Preparation of UV Curable Coating

The product of Example 1 was cooled to 210° C. and sparged with air. Next, 4-methoxy phenol (0.1 parts, MEHQ available from Eastman Chemicals Corporation) and benzophenone (6.8 parts) were added. The mixture was cooled to 120° C. or less and tripropylene glycol diacrylate (23.0 parts TPGDA, available from RadCure Corporation) was added. The mixture was then cooled to 95° C. and its viscosity was adjusted as necessary by addiing additional TPGDA until a Haake viscosity (Eta 4th point) of 7–10 PaS was acheived. The resulting coating was filtered, collected and cured. The coating exhibited superior rub and solvent resistance compared to an epoxy acrylic derived coating.

EXAMPLE 3

Preparation of a Oligomeric Binder

Reclaimed or scrap PET (52.5 parts), 1,2-propanediol (4.0 parts), glycerol (9.6 parts) and Tyzor TBT catalyst (0.4 parts, available from DuPont Company, Tyzor® TBT is a trademark of DuPont Company) were charged to a dry reactor. The mixture was agitated and heated to between 215 and 220° C. under nitrogen and held at that temperature for about 4 hours whereby all the PET dissolved. Benzoic acid (8.8 parts) and phthalic anhydride (22.8 parts) were added over a 1 hour period and the temperature was increased to 230° C. The temperature was further increased to 240° C. and maintained until the acid number no longer was decreasing linearly with time. The binder resin had a softening point of 93° C. and an acid value of 26.8 mg KOH per gram.

EXAMPLE 4

Preparation of UV Curable Coating Vehicle

The product of Example 3 (63.7 parts) was cooled to 205° C. and sparged with air. Benzoflex 400 (6.4 parts, Velsicol) and MEHQ (0.1 parts) were added and the mixture was cooled to 100° C. Tripropylene glycol diacrylate (parts 29.8) was added and the viscosity was adjusted with tripropylene glycol diacrylate (TPGDA, available from RadCure Corporation) to achieve a Haake viscosity (4th point) of 8 to 11 PaS. The coating was filtered and collected. The performance of the coating was superior to the epoxy-acrylic derived standard.

The present invention has been described in detail, including the preferred embodiments thereof. However, it will be appreciated that those skilled in the art, upon consideration of the present disclosure, may make modifications and/or improvements on this invention that fall within the scope and spirit of the invention as set forth in the following claims.

What is claimed is:

1. A polyethylene terephthalate oligomer having a number average molecular weight of about 850 to 5000, a weight average molecular weight of about 4,000 to 25,000 and an acid value about 5 to 50 mg KOH per gram comprised of about 40 to 70 weight percent recurring ethylene terephthalate units, recurring units of $C_3^+$ alpha alkylene terephthalate, hydroxy alkylene terephthalate and pendant units of polybasic aliphatic, alicyclic or aromatic monocarboxylate.

2. The oligomer of claim 1 further containing up to 20 weight percent of aliphatic or aromatic monocarboxylate.

3. The oligomer of claim 2 wherein said monocarboxylate is benzoate.

4. The oligomer of claim 1 wherein said $C_3^+$ alpha alkylene terephthalate is propylene terephthate.

5. The oligomer of claim 4 containing between 3 and 25 weight percent of said propylene terephthalate.

6. The oligomer of claim 1 wherein said hydroxy alkylene terephthalate is 2-hydroxypropylene terephthalate.

7. The oligomer of claim 6 containing between 3 and 25 weight percent of said 2-hydroxypropylene terephthalate.

8. The oligomer of claim 1 wherein said polybasic monocarboxylate is benzene-1-carboxy-2-carboxylate or methylcyclohexane-1-carboxy-2-carboxylate.

9. The oligomer of claim 8 containing between 5 and 40 weight percent of said carboxylate.

10. The oligomer of claim 1 containing between 4 and 8 weight percent of $C_3^+$ alpha alkylene terephthalate, between 7 and 11 weight percent of hydroxy alkylene terephthalate, between 23 and 28 weight percent of polybasic aliphatic, alicyclic or aromatic carboxylate moieties; and wherein said oligmer has a number average molecular weight between 1000 and 2000, a weight average molecular weight between 6,000 and 12,000 and an acid value between 27 and 30 mg KOH per gram.

11. The oligomer of claim 3 containing between 6 and 10 weight percent of said benzoate.

12. The oligomer of claim 1 having a number average molecular weight between 1000 and 2000.

13. The oligomer of claim 1 having a weight average molecular weight between 6,000 and 12,000.

14. The oligomer of claim 1 having an acid value between 27 and 30 mg KOH per gram.

15. A process for converting poly ethylene terephthalate polymer into binder resin having an acid value between 5 and 50 mg KOH/g comprising:

a) reacting PET particles with between 3 and 25 weight percent of a mixture of $C_3^+$ 1,2-alkylene glycol and polyhydric aliphatic alcohol in a weight ratio of 1:2 to 1:5, respectively in the presence of an alcoholysis catalyst for a time sufficient to convert said polymer into an oligomeric PET polyol; and b) contacting said oligomer with about 5 to 40 weight percent of a polybasic aliphatic, alicyclic or aromatic organic acid or acid anhydride under esterification conditions.

16. The process of claim 15 further comprising adding up to 20 weight percent benzoic acid into the step (a) mixture.

17. The process of claim 15 wherein said alcoholysis conditions include temperature between 150 and 250° C. and reaction time between 2 and 12 hours or until the mixture becomes homogeneous.

18. The process of claim 17 wherein said conditions include temperature between 190 and 220° C. and reaction time between 2 and 4 hours.

19. The process of claim 15 wherein said acid anhydride is methylcyclohexane-1,2-dicarboxylic acid anhydride or phthalic anhydride.

20. The process of claim 15 wherein said polyhydric alcohol is glycerol.

21. The process of claim 15 wherein said alcoholysis catalyst is selected from the group consisting of antimony trioxide, tetra alkyl titanates, alkyl metal hydroxides and methoxides and alkaline earth metal oxide and hydroxides.

22. A polyethylene terephthalate oligomer comprising between 40 and 70 weight percent recurring ethylene terephthalate units having the structure:

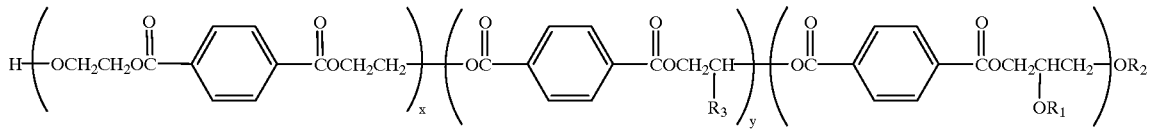

wherein $R_3$ is alkyl; $R_1$ and $R_2$, alike or different, are hydrogen, aliphatic, alicyclic or aromatic carbonyl or carboxy carbonyl; x is an integer of 1 to 20, and y and z are integers of 1–10.

* * * * *